March 5, 1946. W. F. CLAUSSEN 2,396,157
CATALYST REGENERATION
Filed Oct. 8, 1942
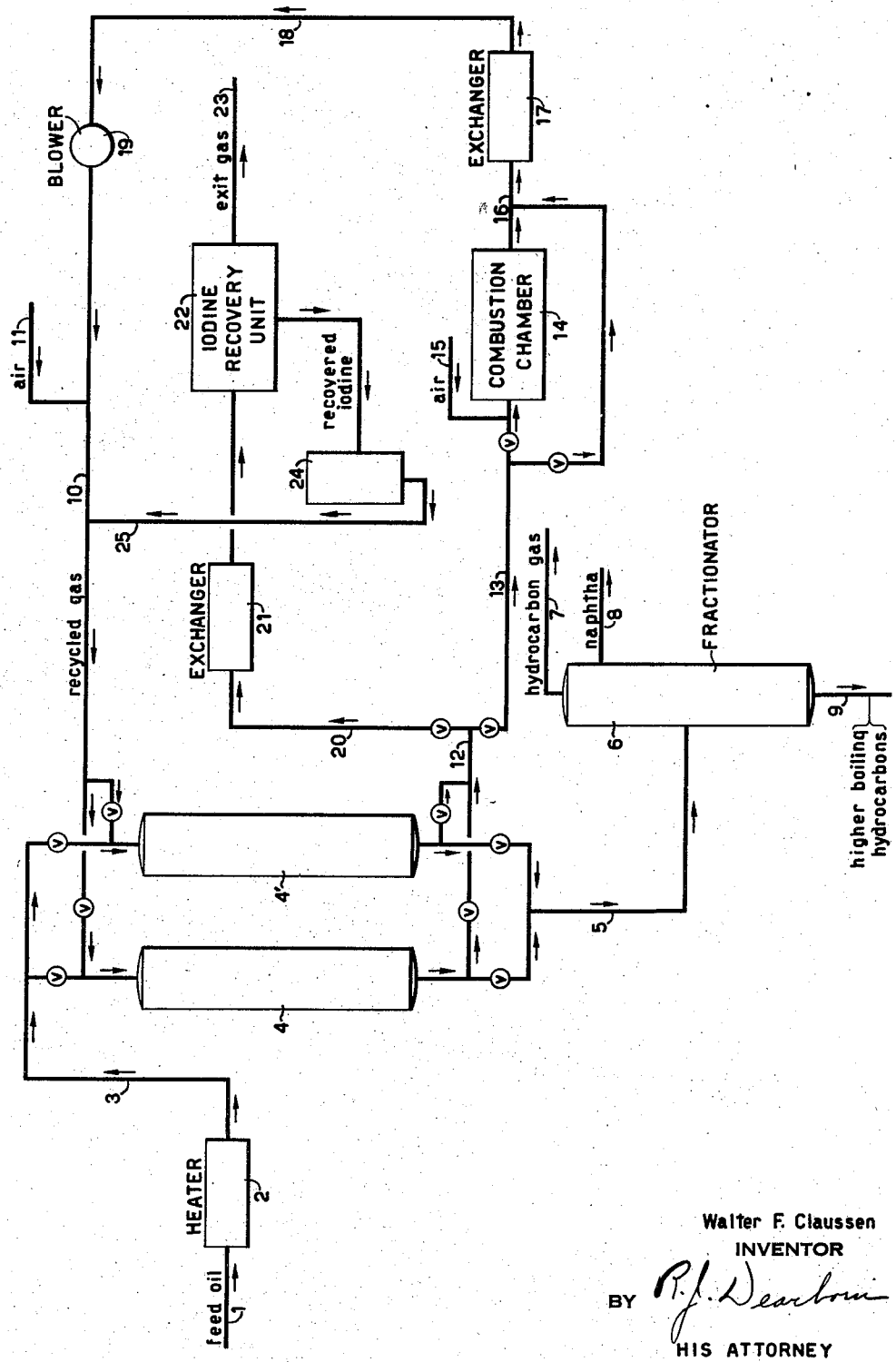
Walter F. Claussen
INVENTOR
BY R. J. Dearborn
HIS ATTORNEY Patented Mar. 5, 1946

2,396,157

UNITED STATES PATENT OFFICE 2,396,157

CATALYST REGENERATION

Walter F. Claussen, Poughkeepsie, N. Y., assignor to The Texas Company, New York, N. Y., a corporation of Delaware Application October 8, 1942, Serial No. 461,274

2 Claims. (Cl. 252—242)

This invention relates to catalyst regeneration and particularly regeneration involving removal of carbonaceous material from catalysts or catalyst masses by combustion.

The invention has application in the regeneration of solid catalytic materials such as employed in the catalytic conversion of hydrocarbons wherein conversion is attended by formation of carbon and carbonaceous bodies which are deposited upon, and within the pores of, the individual catalyst particles, lumps, fragments, pellets or pills, etc. Thus, in the catalytic cracking of oil to produce gasoline hydrocarbons wherein the oil is subjected to the action of a solid catalytic material such as Super-Filtrol at a temperature in the range 800 to 1100° F. substantial amounts of carbon and carbonaceous material are deposited upon the catalyst. This necessitates frequent regeneration of the catalyst in order to restore its activity.

Regeneration is usually accomplished by subjecting the used or spent catalyst to contact with a stream of air or a mixture of air and flue gas or other oxygen-containing gas under conditions such that oxygen available in the gas reacts with the carbon to form combustion gases rich in carbon dioxide but also containing substantial amounts of carbon monoxide. The reaction is exothermic so that a large amount of heat is liberated. For example, the heat of formation in the case of carbon dioxide is about 94,000 calories while that in the case of carbon monoxide is about 68,000 calories. Consequently, the more nearly the combustion reaction proceeds to completion, i. e., namely, the greater the formation of carbon dioxide, the greater is the amount of heat liberated and also the greater is the amount of oxygen required to react with the carbon.

In accordance with the present invention a catalyst containing carbonaceous material is regenerated by treatment with an oxygen-containing gas in the presence of a small amount of a substance effective to inhibit or suppress the formation of carbon dioxide so as to substantially reduce the amount of heat liberated during the regeneration and at the same time reduce the amount of oxygen required for reaction with the solid carbon.

The invention thus contemplates effecting regeneration of catalysts with an oxygen-containing gas in the presence of a small amount of a suppressing agent such as iodine to retard the rate of combustion. The iodine may be present in the regenerating gas to the extent of from about 0.001 to 0.1% and usually less than about 1.0% by volume of the regenerating gas.

Catalytic cracking of hydrocarbon oil may be effected by passing a stream of the vaporized oil at a cracking temperature through a reactor containing a mass of solid catalyst in the form of powder, particles, pellets, pills or lumps, etc. Cracking of the hydrocarbon occurs during passage through the catalyst mass and is accompanied by the formation of a carbonaceous deposit upon the catalyst. As the amount of deposit increases the activity of the catalyst decreases so that periodic regeneration of the catalyst becomes necessary in order to restore its activity.

In a fixed bed type of operation the flow of hydrocarbon feed is cut out of the reactor containing the used or spent catalyst mass and directed to another reactor containing regenerated or active catalyst. After purging the off-stream reactor, a stream of flue gas is continuously passed through the purged mass and a small amount of air or oxygen injected in the stream of flue gas entering the offstream reactor. The amount of oxygen so injected may range from a fraction of a per cent to not over about 5% by volume of the regenerating gas.

Combustion of carbon and a carbonaceous material occurs and the effluent gas stream normally contains about 14 to 15 mol per cent of carbon dioxide and 1 to 2% carbon monoxide on the dry basis. The effluent gas, of course, contains some water vapor produced in the combustion of the carbonaceous material. Advantageously this effluent stream is cooled by passage through a waste heat boiler or other heat exchange device to a temperature of about 800 to 900° F., and at least a substantial portion thereof recycled. The operation is continued until the carbonaceous material has been completely or substantially completely removed from the catalyst mass as is evidenced by the presence of oxygen in substantial amounts in the effluent gas stream.

The volume of gas recycled and the oxygen content of the entering gas is adjusted so that substantially all of the heat of combustion may be carried out of the reactor as sensible heat of the effluent gas.

With the usual catalyst such as fuller's earth, acid treated clays, zeolites and alumina-silica gel type of catalysts it is important to avoid having the temperature of the catalyst mass during regeneration exceed 1200 to 1400° F., depending upon the heat stability of the particular catalyst used. Otherwise the catalyst is adversely affected so that its activity may be destroyed or very materially reduced.

Accordingly, an advantage of the present invention is that by effecting the regeneration in the presence of a suitable suppressing agent as above described so as to suppress the formation of carbon dioxide during regeneration much less heat is liberated, or is liberated more slowly. Therefore regeneration temperatures can be more readily controlled. At the same time less oxygen is required for reaction with the carbon and carbonaceous material. Moreover, the time of regeneration may be materially shortened. In addition the flame front or reaction front will travel more uniformly and rapidly through the catalyst mass.

While a fixed bed catalyst operation has been described, nevertheless the invention is also applicable in a process where a moving bed of catalyst is employed. It is also applicable where the catalyst is in the form of a powder suspended in the hydrocarbon vapors moved through the reaction zone and is continuously withdrawn from the reaction zone, passed to a regenerating zone wherein it is reactivated, and thereafter returned to the reaction zone.

In such operations it is also advantageous to effect the regeneration of the catalyst with oxygen-containing gas in the presence of a small amount of a suppressing agent such as iodine.

It is advantageous as in the case of a fixed bed operation to recycle the regenerating gas since in that way iodine is also continuously recycled and thereby used more effectively.

It is also contemplated that any or all portions of the combustion gas being discharged from the system may pass through a recovery unit wherein the suppressing agent is recovered from the gases for re-use in the regeneration reaction.

Also while iodine has been specifically mentioned as a suitable suppressing agent it is also contemplated that other suppressing agents effective for this purpose may be used. Iodine in the form of hydrogen iodide may be used.

Advantageously the regeneration may be effected under pressures substantially above atmospheric, for example, 50 to 100 pounds per square inch gauge, and even higher.

Mention has been made of regenerating catalysts employed in catalytic cracking of hydrocarbons. However, the invention may be employed in regenerating catalysts used in other types of conversion reactions including reforming, hydroforming, hydrogenation, dehydrogenation, polymerization, thermal isomerization, and thermal alkylation, etc., wherein carbon and carbonaceous deposits form upon the catalyst.

In order to describe the invention further, reference will now be made to the accompanying drawing illustrating a diagram of flow involving catalytic cracking of hydrocarbon oil by passage through a fixed bed of catalyst.

Thus, as indicated in the drawing a feed oil such as gas oil is drawn from a source not shown and passed through a pipe 1 to a heating furnace 2 wherein it is heated to a conversion temperature, as for example, in the range about 850 to 1000° F.

The heated oil in vaporized form is conducted from the heater through a transfer pipe 3 leading to a pipe manifold providing means for introducing the hydrocarbon stream to one or more of a plurality of reactors 4 and 4'. The reactors advantageously comprise vertical vessels containing a mass of active cracking catalyst. The catalyst may be supported within the reactors in the form of a single bed or in the form of a plurality of separate beds through which the hydrocarbon vapors flow in series or in parallel if desired.

Thus, assuming that the reactor 4 is onstream while the reactor 4' is offstream for regeneration the hydrocarbon vapors pass through the reactor 4 wherein cracking occurs.

The cracked hydrocarbons comprising gasoline hydrocarbons and higher boiling hydrocarbons are continuously withdrawn from the reactor through a pipe manifold providing communication with a discharge pipe 5 by which means the products of conversion may be conducted to a fractionator 6.

The products can be segregated into any number of desired fractions, usually, however, provision is made for separating a stream of normally gaseous material which is drawn off through a pipe 7, a stream of naphtha hydrocarbons drawn off through a pipe 8 and a stream of higher boiling hydrocarbons drawn off through a pipe 9.

The flow of hydrocarbons through the reactor 4 may be continued for a period of 3 or 4 hours, advantageously employing a space velocity in the range 2 to 4 volumes of liquid hydrocarbons per unit volume of catalyst per hour.

After being onstream for 3 or 4 hours a substantial amount of carbon and carbonaceous material is deposited upon the catalyst so that the activity of the catalyst is substantially reduced. Thereupon the flow of feed hydrocarbons is switched from the reactor 4 to the reactor 4'.

The offstream reactor 4 is advantageously purged by injection of inert oxygen-free flue gas so as to displace retained hydrocarbons. Thereafter a stream of regenerating gas is introduced through a pipe 10 leading from a source to which reference will be made later. The regenerating gas contains a small amount of oxygen which may be introduced from a source of supply not shown through a pipe 11 to react with the carbon and carbonaceous material. The effluent gas containing the products of combustion is continuously drawn off through a pipe 12.

At least a substantial portion of the effluent gas is conducted from the pipe 12 through a branch pipe 13 leading to a separate combustion chamber 14. In this combustion chamber carbon monoxide contained in the effluent gas is reacted with additional oxygen introduced from a source not shown through a pipe 15 so as to convert it to carbon dioxide. The combustion reaction in the chamber 14 may be effected at a temperature of about 1200° F. allowing sufficient time to effect the conversion. Conditions are maintained in the combustion chamber so as to overcome the inhibiting effect of iodine remaining in the gas and so as to effect substantially complete oxidation of carbon monoxide to carbon dioxide. If desired the reaction may be effected in the presence of an oxidizing catalyst such as a contact mass comprising or containing metal oxides including those of copper, iron, etc.

If desired a portion of the gas flowing through the pipe 13 may be bypassed around the combustion chamber 14 as indicated.

The combustion gases from the combustion chamber 14 are conducted through a pipe 16 to a heat exchanger 17 wherein the temperature of the gas is substantially reduced say to a temperature of about 800 to 900 or 950° F. The cooled gas is then conducted through a pipe 18 leading to the suction of a blower 19 by which means the cooled gas is forced into the previously mentioned pipe 10 for recycling through the catalyst mass undergoing regeneration.

The amount of reactivating gas diverted from the pipe 12 through the pipe 13 will depend upon the rate at which it is desired to recycle the gas in order to provide a sufficient volume of gas passing through the contact mass to remove the heat of combustion of carbonaceous material.

That portion of the effluent gas not so recycled, in other words, the surplus gas, is continuously conducted through a branch pipe 20 leading to a heat exchanger 21 wherein the gas may be cooled sufficiently for the purpose of recovering iodine therefrom prior to discharge of the gas from the system.

According to one modification the gas may be cooled to a temperature of about 0° F. or to some other temperature depending upon the pressure prevailing in order to condense at least a substantial portion of the iodine. The iodine so recovered is then returned to the system for reuse.

Other means of iodine recovery may be employed involving absorption in a suitable absorption medium. In such case the effluent gas may be cooled in the exchanger 21 to a temperature in the range 70 to 100° F. The resulting cooled gases are then passed to an iodine recovery unit 22 wherein the cooled gases are scrubbed with an aqueous potassium iodide solution containing 45% potassium iodide by weight by which means the iodine is extracted from the gases.

The iodine may be recovered from the iodide solution by vaporization or by extraction with ether or naphtha or a combination of both vaporization and extraction may be used.

As indicated in the drawing the scrubbed combustion gas from which iodine has been extracted is discharged through a pipe 23.

The recovered iodine may be accumulated in a tank 24 wherein it is advantageously maintained in liquid form and from which it may be recycled through a pipe 25 for injection in the reactivating gas flowing through the pipe 10.

If desired the iodine recovery may be effected by a combination of condensation and extraction steps. Thus, the bulk of the iodine, for example about 90% of it may be condensed from the gas leaving the system while the residue is removed therefrom by scrubbing in accordance with the procedure already described.

Obviously many modifications and variations of the invention, as hereinbefore set forth, may be made without departing from the spirit and scope thereof, and therefore only such limitations should be imposed as are indicated in the appended claims.

I claim:

1. In the regeneration of a solid catalyst contaminated with solid carbonaceous deposit formed by catalytic conversion of hydrocarbons in contact with the catalyst at cracking temperatures, the steps comprising continuously passing a stream of gas containing free oxygen in contact with the catalyst in a zone of reactivation maintained under a pressure ranging from about atmospheric to 100 pounds and at a temperature effective for the combustion of said carbonaceous material, retarding the rate of said combustion by effecting said contact between catalyst and gas in the presence of iodine amounting to about 0.001 to 0.1% by volume of the gas, adjusting the volume of entering gas and the oxygen content thereof so as to remove substantially all of the heat of combustion as sensible heat of the gas without permitting the temperature of the catalyst mass to exceed about 1200° F., and continuing the flow of reactivating gas through the reactivation zone until substantially all of the carbonaceous material is removed from the catalyst.

2. In the regeneration of a solid catalyst contaminated with solid carbonaceous deposit formed by catalytic conversion of hydrocarbons in contact with the catalyst at cracking temperatures, the steps comprising continuously passing a stream of gas containing free oxygen through a stationary mass of said catalyst maintained under a pressure ranging from about atmospheric to 100 pounds and at a temperature effective for the combustion of said carbonaceous material, retarding the rate of said combustion by effecting said contact between catalyst and gas in the presence of iodine amounting to about 0.001 to 0.1% by volume of the gas, adjusting the volume of entering gas and the oxygen content thereof so as to remove substantially all of the heat of combustion as sensible heat of the gas without permitting the temperature of the catalyst mass to exceed about 1200° F., and continuing the flow of reactivating gas through the reactivation zone until substantially all of the carbonaceous material is removed from the catalyst.

WALTER F. CLAUSSEN.